United States Patent Office 3,804,849
Patented Apr. 16, 1974

3,804,849
2-AMINO-4,5,7,8-TETRAHYDRO-6H-THIAZOLO OR OXAZOLO[5,4-d]AZEPINES AND SALTS
Gerhart Griss, Manfred Kleemann, Wolfgang Grell, and Helmut Ballhause, Biberach am der Riss, Germany, assignors to Boehringer Ingelheim GmbH, Ingelheim am Rhein, Germany
No Drawing. Filed Aug. 4, 1971, Ser. No. 169,065
Claims priority application, Germany, Aug. 14, 1970, P 20 40 510.1; June 2, 1971, P 21 27 267.3
Int. Cl. C07d 99/04, 99/10
U.S. Cl. 260—306.8 F
10 Claims

ABSTRACT OF THE DISCLOSURE

Compounds of the formula

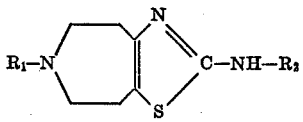

or

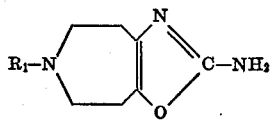

wherein $R_1$ is hydrogen, straight or branched alkyl of 1 to 4 carbon atoms, hydroxy-alkyl of 1 to 4 carbon atoms, allyl, cycloalkyl, hexahydrobenzyl, phenyl, phenethyl, benzyl, mono- or di-halobenzyl, mono-, di- or tri-methoxybenzyl, trifluoromethyl-benzyl or (alkyl of 1 to 3 carbon atoms)-benzyl, and $R_2$ is hydrogen, straight or branched alkyl of 1 to 5 carbon atoms, allyl, cycloalkyl, phenyl, benzyl or phenethyl, and non-toxic, pharmacologically acceptable acid addition salts thereof; the compounds as well as their salts are useful as hypotensives, sedatives, antitussives and antiphlogistics.

---

The present invention relates to novel 2-amino-4,5,7,8-tetrahydro - 6H - thiazolo or oxazolo[5,4-d]azepines and non-toxic acid addition salts thereof, as well as to methods of preparing these compounds.

More particularly, the present invention relates to a novel class of fused-ring compounds of the formula

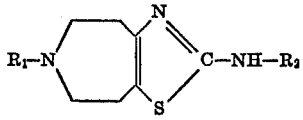

or

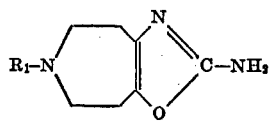

wherein $R_1$ is hydrogen, straight or branched alkyl of 1 to 4 carbon atoms, hydroxy-alkyl of 1 to 4 carbon atoms, allyl, cycloalkyl, hexahydrobenzyl, phenyl, phenethyl, benzyl, mono- or di-halobenzyl, mono-, di- or tri-methoxybenzyl, trifluoromethyl-benzyl or (alkyl of 1 to 3 carbon atoms)-benzyl, and $R_2$ is hydrogen, straight or branched alkyl of 1 to 5 carbon atoms, allyl, cycloalkyl, phenyl, benzyl or phenethyl, and non-toxic, pharmacologically acceptable acid addition salts thereof.

The compounds embraced by Formulas I and Ia may be prepared as follows:

METHOD A

By reacting a hydrohalic acid addition salt of a 5-halo-azepin-4-one of the formula

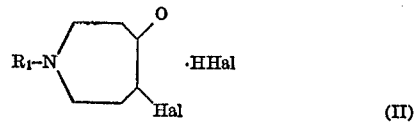

wherein $R_1$ has the same meanings as in Formulas I and Ia, and Hal is chlorine, bromine or iodine, with urea or a thiourea of the formula

wherein $R_2$ has the same meanings as in Formula I.

The reaction is preferably performed in the molten state and, if necessary, in the presence of a catalytic amount of an acid, such as glacial acetic acid; however, it may also be performed in the presence of a solvent medium.

When the 5-halo-azepinone salt (II) is reacted with a thiourea (III), the reaction may be performed, for example, in the presence of a solvent medium, such as an aliphatic alcohol, dimethylformamide, glacial acetic acid, water or a mixture of any two or more of these, at a temperature between room temperature and the boiling point of the solvent medium, and optionally in the presence of an acid-binding agent.

When the 5-halo-azepinone salt is reacted with urea, the reaction may likewise be performed in the presence of a solvent medium, such as ethanol, isopropanol, tert.-butanol, glacial acetic acid, dioxane, dimethylformamide or a mixture of any two or more of these, at a temperature up to the boiling point of the solvent medium, and optionally in the presence of an acid, such as glacial acetic acid.

Examples of suitable acid-binding agents are inorganic bases, such as sodium carbonate or potassium carbonate, or tertiary organic bases, such as triethylamine or pyridine. When used in commensurate excess, the organic base may simultaneously serve as the solvent medium.

METHOD B

For the preparation of a compound of the Formula I wherein $R_1$ is hydroxyalkyl of 1 to 4 carbon atoms, by reacting a 2 - acylamino - 4,5,7,8 - tetrahydro-6H-thiazolo [5,4-d]azepine of the formula

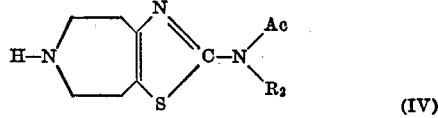

wherein $R_2$ has the same meanings as in Formula I and Ac is carboxylic acyl, such as benzoyl, with an alkyleneoxide of the formula

wherein $R_3$ is hydrogen or alkyl of 1 to 2 carbon atoms, followed by removal of the acyl radical by acid hydrolysis.

The reaction is preferably performed in the presence of a solvent, such as methanol, and at temperatures between 0 and 25° C. If the reaction requires higher temperatures, it is advantageously performed in a pressure vessel, such as an autoclave.

The subsequent acid hydrolysis is performed in the presence of an inert solvent at temperatures up to the boiling point of the solvent, pursuant to conventional methods.

The compounds embraced by Formulas I and Ia are organic bases and therefore form acid addition salts with inorganic or organic acids. Examples of non-toxic, pharmacologically acceptable acid addition salts are those formed with hydrochloric acid, hydrobromic acid, sulfuric acid, phosphoric acid, tartaric acid, succinic acid, citric acid, adipic acid, pamoic acid, fumaric acid, maleic acid, 8-chlorotheophylline or the like.

The starting compounds of the Formula II for method A may be prepared by halogenating the corresponding azepin-4-ones in glacial acetic acid with an equimolar amount of chlorine, bromine or iodine, and do not need to be purified prior to use as starting compounds in this method.

Some of the azepin-4-ones needed for the preparation of starting Compounds II are described in the literature [see Ak. Yokov et al., Bull. Chem. Soc. Japan, 29, 631 (1959)]. The 1-substituted azepin-4-ones, which are not described in the literature, may be prepared by the Dieckmann condensation (Organic Reactions, 15, 1–203) of ethyl N-substituted N-(2'-ethoxycarbonyl-ethyl)-4-amino-butyrates, using preferably potassium tert.-butylate or sodium hydride as the condensation agent, followed by hydrolysis and decarboxylation of the mixture of 1-substituted ethyl hexahydro-4H-azepin-4-one-3- and 5-carboxylates intermediates in the presence of acids. The IR band of the carbonyl group of these compounds lies at 1695–1700 cm.$^{-1}$ (methylene chloride), and that of their salts at 1720 cm.$^{-1}$ (KBr).

The starting compounds of the Formula IV for method B may be obtained by reacting 5-bromo-azepin-4-one with correspondingly N-acylated thiourea.

The following examples further illustrate the present invention and will enable others skilled in the art to understand it more completely. It should be understood, however, that the invention is not limited solely to the particular examples given below.

EXAMPLE 1

2-amino-6-benzyl-4,5,7,8-tetrahydro-6H-thiazolo[5,4-d]azepine and its dihydrochloride by method A A mixture consisting of 11 gm. (34.6 millimols) of 1-benzyl-5-bromo-hexahydro-1H - azepin-4-one hydrochloride [M.P. 158° C.; prepared from 1-benzyl-hexahydro-1H-azepin-4-one hydrochloride (M.P. 189° C.) by bromination with an equimolar amount of bromine in glacial acetic acid], 50 ml. of water and 2.63 gm. (34.6 millimols) of thiourea was stirred for 12 hours at room temperature. Thereafter, the reaction solution was adjusted to pH 12 with sodium hydroxide, admixed with 20 ml. of methanol, and the mixture was extracted with chloroform. The chloroform extracts were dried over sodium sulfate and evaporated. The residue, 2 - amino-6-benzyl-4,5,7,8-tetrahydro-6H - thiazolo[5,4-d]azepine, was dissolved in hot ethanol, and the resulting solution was acidified with isopropanolic hydrochloric acid. Upon cooling, 6.2 gm. (51% of theory) of the dihydrochloride, M.P. 233° C. (decomp.), of the formula

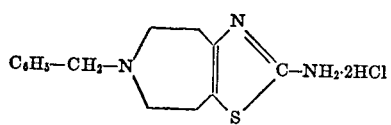

crystallized out.

*Analysis.*—Calculated for $C_{14}H_{17}N_3S \cdot 2HCl$ (mol. wt. 332.30) (percent): C, 50.70; H, 5.77; N, 12.65. Found (percent): C, 50.30; H, 5.84; N, 12.80.

EXAMPLE 2

A mixture consisting of 77.5 gm. (208 millimols) of 1-benzyl-5-bromo-hexahydro-4H-azepin - 4 - one hydrobromide, 600 ml. of ethanol and 15.8 gm. (208 millimols) of thiourea was heated at its boiling point for two hours, during which time 2 - amino-6-benzyl-4,5,7,8-tetrahydro-6H-thiazolo[5,4-d]azepine hydrobromide crystallized out. After cooling, the crystals were collected by vacuum filtration, dissolved in water, the aqueous solution was adjusted to pH 12 with sodium hydroxide, and the free base liberated thereby was extracted with chloroform. The chloroform extracts were evaporated, the residue was dissolved in 100 ml. of hot ethanol, and the hot solution was admixed with 50 ml. of saturated isopropanolic hydrochloric acid and 100 ml. of ethyl acetate. Upon cooling, 40 gm. (59% of theory) of 2 - amino-6-benzyl-4,5,7,8-tetrahydro-6H - thiazolo[5,4-d]azepine dihydrochloride, M.P. 233° C. (decomp.), crystallized out.

EXAMPLE 3

11 gm. (34.6 millimols) of 1 - benzyl-5-bromo-hexahydro-4H-azepin-4-one hydrobromide and 3.63 gm. (34.6 millimols) of thiourea were intimately admixed with each other, and the mixture was melted by heating it to between 80 and 100° C. for 10 minutes. Thereafter, the molten mass was allowed to cool, was then dissolved in water, and the aqueous solution was made alkaline with sodium hydroxide and then thoroughly extracted with chloroform. The combined chloroform extracts were evaporated to dryness, the residual free base was dissolved in hot ethanol, and the hot solution was acidified with isopropanolic hydrochloric acid. Upon addition of ethyl acetate, 3.1 gm. (25.5% of theory) of 2-amino-6-benzyl-4,5,7,8-tetrahydro - 6H - thiazolo[5,4-d]azepine dihydrochloride, M.P. 233° C. (decomp.), crystallized out.

EXAMPLE 4

2-amino-6-benzyl-4,5,7,8-tetrahydro-6H-thiazolo[5,4-d] azepine dihydrochloride by method A A solution of 6.1 gm. (30 millimols) of 1-benzyl-hexahydro-4H-azepin-4-one (B.P. 98–100° C. at 0.1 mm. Hg) in a mixture of 100 ml. of glacial acetic acid and 15 ml. of a 40% hydrobromic acid solution in glacial acetic acid was admixed at room temperature with a solution of 4.8 gm. (30 millimols) in 50 ml. of glacial acetic acid. The glacial acetic acid and the hydrobromic acid were then distilled off in vacuo, the residual oily 1-benzyl-5-bromo-hexahydro-4H-azepin-4-one hydrobromide was dissolved in 200 ml. of ethanol, the ethanolic solution was admixed with 2.28 gm. (30 millimols) of thiourea, and the mixture was heated at its boiling point for 2 hours. Upon cooling, 2-amino - 6 - benzyl-4,5,7,8-tetrahydro-6H-thiazolo[5,4-d] azepine hydrobromide crystallized out, which was converted into its dihydrochloride, M.P. 232° C., as described in Example 2. The yield was 6 gm. (60% of theory).

*Analysis.*—Calculated for $C_{14}H_{17}N_3S \cdot 2HCl$ (mol. wt. 332.30) (percent): C, 50.70; H, 5.77; N, 12.65. Found (percent): C, 50.49; H, 6.01; N, 12.58.

EXAMPLE 5

Using a procedure analogous to that described in Example 4, 2-amino-6-(p-fluoro-benzyl)-4,5,7,8-tetrahydro-6H-thiazolo[5,4-d]azepine dihydrochloride, M.P. 236° C. (decomp.), of the formula

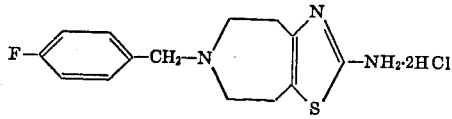

was prepared from 1-(p-fluoro-benzyl)-hexahydro-4H-azepin-4-one hydrochloride (M.P. 208° C.). The yield was 55% of theory.

*Analysis.*—Calculated for $C_{14}H_{16}FN_3S \cdot 2HCl$ (mol. wt. 350.29) (percent): C, 48.00; H, 5.17; N, 12.00. Found (percent): C, 48.00; H, 5.10; N, 12.20.

EXAMPLE 6

Using a procedure analogous to that described in Example 4, 2-amino-6-(p-chloro-benzyl)-4,5,7,8-tetrahydro-6H-thiazolo[5,4-d]azepine dihydrochloride, M.P. 243° C., of the formula

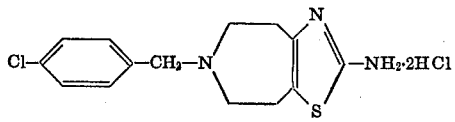

was prepared from 1-(p-chloro-benzyl)-hexahydro-4H-azepin-4-one hydrochloride (210° C.). The yield was 53% of theory.

*Analysis.*—Calculated for $C_{14}H_{16}ClN_3S \cdot 2HCl$ (mol. wt. 366.74) (percent): C, 45.86; H, 4.95; N, 11.46. Found (percent): C, 45.80; H, 5.03; N, 11.26.

EXAMPLE 7

Using a procedure analogous to that described in Example 4, 2-amino-6-(m-chloro-benzyl)-4,5,7,8-tetrahydro-6H-thiazolo[5,4-d]azepine dihydrochloride, M.P. 244° C., was prepared from 1-(m-chloro-benzyl)-hexahydro-4H-azepin-4-one hydrochloride (212° C.). The yield was 46% of theory.

*Analysis.*—Calculated for $C_{14}H_{16}ClN_3S \cdot 2HCl$ (mol. wt. 366.74) (percent): C, 45.86; H, 4.95; N, 11.46. Found (percent): C, 45.80; H, 5.09; N, 11.30.

EXAMPLE 8

Using a procedure analogous to that described in Example 4, 2-amino-6-(m,p-dichloro-benzyl)-4,5,7,8-tetrahydro - 6H - thiazolo[5,4-d]azepine dihydrochloride, M.P. 246° C. (decomp.), of the formula

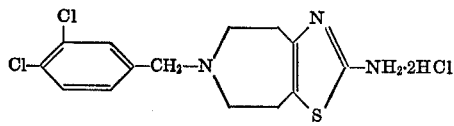

was prepared from 1-(m,p-dichloro-benzyl)-hexahydro-4H-azepin-4-one hydrochloride (IR spectrum in KBr: carbonyl band at 1720 cm.$^{-1}$). The yield was 28% of theory.

*Analysis.*—Calculated for $C_{14}H_{15}Cl_2N_3S \cdot 2HCl$ (mol. wt. 401.19) (percent): C, 41.91; H, 4.27; N, 10.47. Found (percent): C, 42.00; H, 4.20; N, 10.32.

EXAMPLE 9

Using a procedure analogous to that described in Example 4, 2-amino-6-(o,o'-dichloro-benzyl)-4,5,7,8-tetrahydro-6H-thiazolo[5,4-d]azepine dihydrochloride, M.P. 240° C. (decomp.), was prepared from 1-(o,o'-dichloro-benzyl)-hexahydro-4H-azepin-4-one hydrochloride (IR spectrum in KBr: carbonyl band at 1720 cm.$^{-1}$). The yield was 23% of theory.

*Analysis.*—Calculated for $C_{14}H_{15}Cl_2N_3S \cdot 2HCl$ (mol. wt. 401.19) (percent): C, 41.91; H, 4.27; N, 10.47. Found (percent): C, 42.10; H, 4.33; N, 10.75.

EXAMPLE 10

Using a procedure analogous to that described in Example 4, 2 - amino-6-(o,p-dichloro-benzyl)-4,5,7,8-tetrahydro - 6H - thiazolo[5,4-d]azepine dihydrochloride, M.P. 230° C. (decomp.), was prepared from 1-(o,p-dichloro-benzyl)-hexahydro - 4H - azepin - 4 - one hydrochloride (IR spectrum in KBr: carbonyl band at 1720 cm.$^{-1}$). The yield was 56% of theory.

*Analysis.*—Calculated for $C_{14}H_{15}Cl_2N_3S \cdot 2HCl$ (mol. wt. 401.19) (percent): C, 41.91; H, 4.27; N, 10.47. Found (percent): C, 41.90; H, 4.43; N, 10.75.

EXAMPLE 11

Using a procedure analogous to that described in Example 4, 2 - amino - 6 - (p-bromo-benzyl)-4,5,7,8-tetrahydro - 6H - thiazolo[5,4-d]azepine dihydrochloride, M.P. 251° C. (decomp.), was prepared from 1-(p-bromo-benzyl)-hexahydro-4H-azepin-4-one hydrochloride (M.P. 215° C.). The yield was 49% of theory.

*Analysis.*—Calculated for $C_{14}H_{16}BrN_3S \cdot 2HCl$ (mol. wt. 411.20) (percent): C, 40.89; H, 4.41; N, 10.22. Found (percent): C, 40.85; H, 4.56; N, 9.95.

EXAMPLE 12

Using a procedure analogous to that described in Example 4, 2 - amino - 6 - (o-bromo-benzyl)-4,5,7,8-tetrahydro - 6H - thiazolo[5,4-d]azepine dihydrochloride, M.P. 233° C. (decomp.), was prepared from 1-(o-bromo-benzyl)-hexahydro - 4H - azepin - 4 - one hydrochloride (M.P. 179° C.). The yield was 18% of theory.

*Analysis.*—Calculated for $C_{14}H_{16}BrN_3S \cdot 2HCl$ (mol. wt. 411.20) (percent): C, 40.89; H, 4.41; N, 10.22. Found (percent): C, 41.20; H, 4.66; N, 9.85.

EXAMPLE 13

Using a procedure analogous to that described in Example 4, 2 - amino - 6 - (m-bromo-benzyl)-4,5,7,8-tetrahydro - 6H - thiazolo[5,4-d]azepine dihydrochloride, M.P. 255° C. (decomp.), of the formula

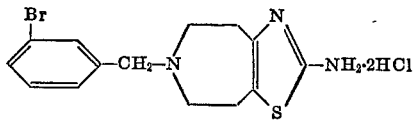

was prepared from 1-(m-bromo-benzyl)-hexahydro-4H-azepin-4-one hydrochloride (M.P. 192° C.). The yield was 20% of theory.

*Analysis.*—Calculated for $C_{14}H_{16}BrN_3S \cdot 2HCl$ (mol. wt. 411.20) (percent): C, 40.89; H, 4.41; N, 10.22. Found (percent): C, 40.85; H, 4.57; N, 10.08.

EXAMPLE 14

Using a procedure analogous to that described in Example 2, 2 - amino - 6 - (p-methyl-benzyl)-4,5,7,8-tetrahydro-6H-thiazolo[5,4-d]azepine dihydrochloride, M.P. 239° C. (decomp.), of the formula

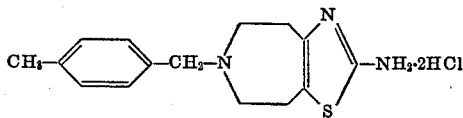

was prepared from 1-(p-methyl-benzyl)-5-bromo-hexahydro-4H-azepin-4-one hydrobromide (M.P. 155–156° C.). The yield was 20% of theory.

*Analysis.*—Calculated for $C_{15}H_{19}N_3S \cdot 2HCl$ (mol. wt. 346.32) (percent): C, 52.02; H, 6.11; N, 12.13. Found (percent): C, 51.90; H, 6.29; N, 12.28.

EXAMPLE 15

Using a procedure analogous to that described in Example 4, 2 - amino - 6 - (o-methyl-benzyl)-4,5,7,8-tetrahydro-6H-thiazolo[5,4-d]azepine dihydrochloride, M.P. 241° C. (decomp.), was prepared from 1-(o-methyl-benzyl)-hexahydro - 4H - azepin - 4 - one hydrochloride (M.P. 165° C.). The yield was 36% of theory.

*Analysis.*—Calculated for $C_{15}H_{19}N_3S \cdot 2HCl$ (mol. wt. 346.32) (percent): C, 52.02; H, 6.11; N, 12.13. Found (percent): C, 52.00; H, 6.11; N, 11.93.

EXAMPLE 16

Using a procedure analogous to that described in Example 4, 2 - amino - 6 - (m-methyl-benzyl)-4,5,7,8-tetrahydro - 6H - thiazolo[5,4-d]azepine dihydrochloride, M.P. 233° C. (decomp.), was prepared from 1-(m-methyl-benzyl)-hexahydro-4H-azepin-4-one hydrochloride (M.P. 169° C.). The yield was 30% of theory.

*Analysis.*—Calculated for $C_{15}H_{19}N_3S \cdot 2HCl$ (mol. wt. 346.32) (percent): C, 52.02; H, 6.11; N, 12.13. Found (percent): C, 52.30; H, 6.30; N, 12.35.

EXAMPLE 17

Using a procedure analogous to that described in Example 4, 2 - amino - 6 - (p-trifluoromethyl-benzyl)-4,5,7,8 - tetrahydro - 6H - thiazolo[5,4-d]azepine dihydrochloride, M.P. 237–238° C., of the formula

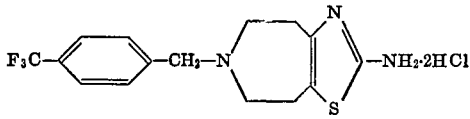

was prepared from 1-(p-trifluoromethyl-benzyl)-hexahydro-4H-azepin-4-one hydrochloride (IR spectrum: carbonyl band at 1700 cm.$^{-1}$). The yield was 30% of theory.

*Analysis.*—Calculated for $C_{15}H_{16}F_3N_3S \cdot 2HCl$ (mol. wt. 400.30) (percent): C, 45.01; H, 4.54; N, 10.50. Found (percent): C, 44.80; H, 4.74; N, 10.41.

EXAMPLE 18

Using a procedure analogous to that described in Example 4, 2-amino-6-(m-trifluoromethyl-benzyl)-4,5,7,8-tetrahydro-6H-thiazolo[5,4-d]azepine dihydrochloride, M.P. 246° C. (decomp.), was prepared from 1-(m-trifluoromethylbenzyl)-hexahydro-4H-azepin-4-one hydrochloride (M.P. 176–178° C.). The yield was 25.5% of theory.

*Analysis.*—Calculated for $C_{15}H_{16}F_3N_3S \cdot 2$ HCl (mol. wt 400.30) (percent): C, 45.01; H, 4.54; N, 10.50. Found (percent): C, 44.80; H, 4.74; N, 10.41.

EXAMPLE 19

Using a procedure analogous to that described in Example 4, 2-amino-6-(p-methoxy-benzyl)-4,5,7,8-tetrahydro-6H-thiazolo[5,4-d]azepine dihydrochloride, M.P. 230° C. (decomp.), of the formula

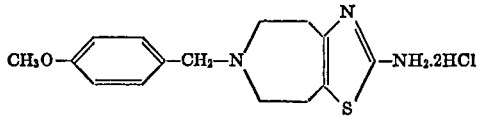

was prepared from 1-(p-methoxy-benzyl)-hexahydro-4H-azepin-4-one hydrochloride (IR spectrum in KBr: carbonyl band at 1720 cm.$^{-1}$). The yield was 31% of theory.

*Analysis.*—Calculated for $C_{15}H_{19}ON_3S \cdot 2$ HCl (mol. wt. 362.32) (percent): C, 49.72; H, 5.84; N, 11.59. Found (percent): C, 49.70; H, 5.96; N, 11.85.

EXAMPLE 20

Using a procedure analogous to that described in Example 4, 2-amino-6-(m,p-dimethoxy-benzyl)-4,5,7,8-tetrahydro - 6H - thiazolo[5,4 - d]azepine dihydrochloride, M.P. 238° C. (decomp.), of the formula

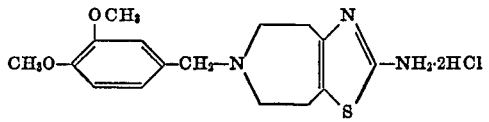

was prepared from 1-(m,p-dimethoxy-benzyl)-hexahydro-4H-azepin-4-one hydrochloride (IR spectrum in KBr: carbonyl band at 1720 cm.$^{-1}$). The yield was 44% of theory.

*Analysis.*—Calculated for $C_{16}H_{21}O_2N_3S \cdot 2HCl$ (mol. wt. 392.35) (percent): C, 48.99; H, 5.91; N, 10.72. Found (percent): C, 49.00; H, 5.65; N, 10.53.

EXAMPLE 21

Using a procedure analogous to that described in Example 4, 2-amino-6-(3',5'-dimethoxy-benzyl)-4,5,7,8-tetrahydro - 6H - thiazolo[5,4 - d]azepine dihydrochloride, M.P. 215° C. (decomp.), was prepared from 1-(3',5'-dimethoxy-benzyl)-hexahydro-4H-azepin-4-one hydrochloride (IR spectrum in KBr: carbonyl band at 1720 cm.$^{-1}$). The yield was 28% of theory.

*Analysis.*—Calculated for $C_{16}H_{21}O_2N_3S \cdot 2$ HCl (mol. wt. 392.35) (percent): C, 48.99; H, 5.91; N, 10.72. Found (percent): C, 48.80; H, 6.20; N, 10.40.

EXAMPLE 22

Using a procedure analogous to that described in Example 4, 2-amino-6-(o,m-dimethoxy-benzyl)-4,5,7,8-tetrahydro - 6H - thiazolo[5,4 - d]azepine dihydrochloride, M.P. 226° C. (decomp.), was prepared from 1-(o,m-dimethoxy-benzyl) - hexahydro - 4H-azepin-4-one hydrochloride (IR spectrum in KBr: carbonyl band at 1720 cm.$^{-1}$). The yield was 37% of theory.

*Analysis.*—Calculated for $C_{16}H_{21}O_2N_3S \cdot 2$ HCl (mol. wt. 392.35) (percent): C, 48.99; H, 5.91; N, 10.72. Found (percent): C, 49.10; H, 5.95; N, 10.75.

EXAMPLE 23

Using a procedure analogous to that described in Example 4, 2-amino-6-(3',5',5'-trimethoxy-benzyl)-4,5,7,8-tetrahydro-6H-thiazolo[5,4-d]azepine dihydrochloride, M.P. 230° C. (decomp.), of the formula

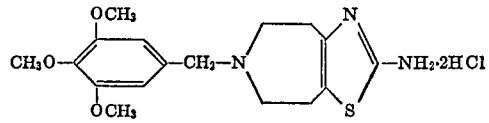

was prepared from 1-(3',4',5'-trimethoxy-benzyl-hexahydro-4H-azepin-4-one hydrochloride (IR spectrum in KBr: carbonyl band at 1720 cm.$^{-1}$). The yield was 53% of theory.

*Analysis.*—Calculated for $C_{17}H_{23}O_3N_3S \cdot 2$ HCl (mol. wt. 422.38) (percent): C, 48.34; H, 5.97; N, 9.95. Found (percent): C, 48.20; H, 5.96; N, 10.00.

EXAMPLE 24

Using a procedure analogous to that described in Example 4, 2-amino-6-phenyl-4,5,7,8 - tetrahydro - 6H-thiazolo[5,4-d]azepine dihydrochloride, M.P. 202° C. (decomp.), of the formula

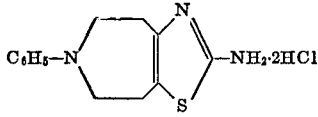

was prepared from 1-phenyl-hexahydro-4H-azepin-4-one hydrochloride (M.P. 144° C.). The yield was 14% of theory.

*Analysis.*—Calculated for $C_{13}H_{15}N_3S \cdot 2HCl$ (mol. wt. 318.27) (percent): C, 49.05; H, 5.39; N, 13.20. Found (percent): C, 49.30; H, 5.50; N, 13.45.

EXAMPLE 25

Using a procedure analogous to that described in Example 4, 2-amino-6-($\beta$-phenethyl)-4,5,7,8-tetrahydro-6H-thiazolo[5,4 - d]azepine dihydrochloride, M.P. 226° C. (decomp.), of the formula

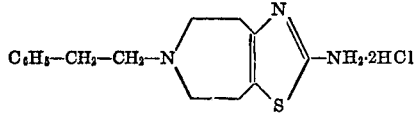

was prepared from 1-($\beta$-phenethyl)-hexahydro-4H-azepin-4-one (B.P. 130–134° C. at 0.4 mm. Hg). The yield was 17.5% of theory.

*Analysis.*—Calculated for $C_{15}H_{19}N_3S \cdot 2HCl$ (mol. wt. 346.32) (percent): C, 52.02; H, 6.12; N, 12.11. Found (percent): C, 52.20; H, 6.21; N, 12.17.

EXAMPLE 26

Using a procedure analogous to that described in Example 4, 2-amino-6-($\alpha$-phenethyl)-4,5,7,8-tetrahydro-6H-thiazolo[5,4 - d]azepine dihydrochloride, M.P. 204° C.

(decomp.), was prepared from 1-(α-phenethyl)-hexahydro-4H-azepin-4-one (B.P. 105° C. at 0.1 mm. Hg). The yield was 32% of theory.

*Analysis.*—Calculated for C₁₅H₁₉N₃S·2HCl (mol. wt. 346.32) (percent): C, 52.02; H, 6.12; N, 12.11. Found (percent): C, 52.50; H, 6.29; N, 11.60.

EXAMPLE 27

Using a procedure analagous to that described in Example 4, 2-amino-4,5,7,8-tetrahydro - 6H-thiazolo[5,4-d]azepine dihydrochloride, M.P. 254° C. (decomp.), of the formula

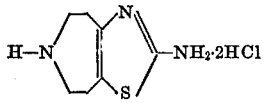

was prepared from hexahydro-4H-azepin - 4 - one hydrochloride (M.P. 177–178° C.). The yield was 18% of theory.

*Analysis.*—Calculated for C₇H₁₁N₃S·2HCl (mol. wt. 242.17) (percent): C, 34.72; H, 5.41; N, 17.35. Found (percent): C, 35.00; H, 5.45; N, 17.50.

EXAMPLE 28

Using a procedure analogous to that described in Example 1, 2-amino-6-methyl-4,5,7,8 - tetrahydro - 6H-thiazolo[5,4-d]azepine dihydrochloride, M.P. 257° C. (decomp.), of the formula

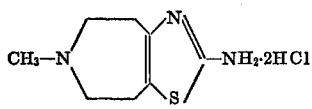

was prepared from 1-methyl - 5 - bromo-hexahydro - 4H-azepin-4-one hydrobromide (M.P. 110° C.). The yield was 52% of theory.

*Analysis.*—Calculated for C₈H₁₃N₃S·2HCl (mol. wt. 256.20) (percent): C, 37.50; H, 5.90; N, 16.40. Found (percent): C, 37.45; H, 6.27; N, 16.35.

EXAMPLE 29

Using a procedure analogous to that described in Examples 1 and 2, 2-amino-6-ethyl-4,5,7,8-tetrahydro-6H-thiazolo[5,4-d]azepine dihydrochloride, M.P. 228° C. decomp.), was prepared from 1-ethyl-5-bromo-hexahydro-4H-azepin-4-one hydrobromide (M.P. 138° C.). The yield was 52% of theory.

*Analysis.*—Calculated for C₉H₁₅N₃S·2HCl (mol. wt. 270.23) (percent): C, 40.01; H, 6.34; N, 15.55. Found (percent): C, 39.90; H, 6.28; N, 15.32.

EXAMPLE 30

Using a procedure analogous to that described in Example 1, 2-amino-6-n-propyl - 4,5,7,8-tetrahydro-6H-thiazolo[5,4-d]azepine, M.P. 145° C., was prepared from 1-n-propyl-5-bromo-hexahydro - 4H-azepin-4-one hydrobromide (M.P. 126° C.). The yield was 56% of theory.

*Analysis.*—Calculated for C₁₀H₁₇N₃S (mol. wt. 211.32) (percent): C, 56.27; H, 8.11; N, 19.88. Found (percent): C, 56.65; H, 8.05; N, 19.75.

EXAMPLE 31

Using a procedure analogous to that described in Examples 1 and 2, 2-amino-6-isopropyl-4,5,7,8-tetrahydro-6H - thiazolo[5,4-d]azepine dihydrochloride, M.P. 225° C. (decomp.), was prepared from 1-isopropyl-5-bromo-hexahydro-4H-azepin-4-one hydrobromide (M.P. 114° C.). The yield was 35% of theory.

*Analysis.*—Calculated for C₁₀H₁₇N₃S·2HCl (mol. wt. 284.25) (percent): C, 42.25; H, 6.74; N, 14.78. Found (percent): C, 41.90; H, 7.05; N, 14.40.

EXAMPLE 32

Using a procedure analogous to that described in Examples 1 and 2, 2-amino-6-n-butyl-4,5,7,8-tetrahydro-6H-thiazolo[5,4-d]azepine dihydrochloride, M.P. 254–256° C. (decomp.), was prepared from 1-n-butyl-5-bromo-hexahydro - 4H-azepin-4-one hydrobromide (M.P. 144° C.). The yield was 59% of theory.

*Analysis.*—Calculated for C₁₁H₁₉N₃S·2HCl (mol. wt. 298.28) (percent): C, 44.29; H, 7.10; N, 14.08. Found (percent): C, 44.20; H, 6.88; N, 13.86.

EXAMPLE 33

Using a procedure analogous to that described in Example 1, 2-amino - 6 - isobutyl-4,5,7,8-tetrahydro-6H-thiazolo[5,4-d]azepine dihydrochloride, M.P. 238° C. (decomp.), was prepared from 1-isobutyl-5-bromo-hexahydro-4H-azepin-4-one hydrobromide. The yield was 41% of theory.

*Analysis.*—Calculated for C₁₁H₁₉N₃S·2HCl (mol. wt. 298.28) (percent): C, 44.29; H, 7.10; N, 14.08. Found (percent): C, 44.50; H, 7.10; N, 13.96.

EXAMPLE 34

Using a procedure analogous to that described in Example 4, DL-2-amino - 6-(butyl-2')-4,5,7,8-tetrahydro-6H-thiazolo[5,4-d]azepine dihydrochloride, M.P. 236° C. (decomp.), was prepared from DL-1-(butyl-2')-hexahydro-4H-azepin-4-one (B.P. 58–60° C. at 0.1 mm. Hg). The yield was 17% of theory.

*Analysis.*—Calculated for C₁₁H₁₉N₃S·2HCl (mol. wt. 298.28) (percent): C, 44.29; H, 7.10; N, 14.08. Found (percent): C, 44.10; H, 7.20; N, 13.98.

EXAMPLE 35

Using a procedure analogous to that described in Example 1, 2-amino-6-(tert.butyl) - 4,5,7,8-tetrahydro-6H-thiazolo[5,4-d]azepine dihydrochloride, M.P. 224° C. (decomp.), was prepared from 1-(tert.butyl)-5-bromo-hexahydro - 4H-azepin-4 - one-hydrobromide (M.P. 182° C.). The yield was 29% of theory.

*Analysis.*—Calculated for C₁₁H₁₉N₃S·2HCl (mol. wt. 298.28) (percent): C, 44.29; H, 7.10; N, 14.08. Found (percent): C, 44.10; H, 7.26; N, 13.88.

EXAMPLE 36

Using a procedure analogous to that described in Example 4, 2-amino - 6 - allyl-4,5,7,8-tetrahydro-6H-thiazolo[5,4-d]azepine dihydrochloride, M.P. 245° C. (decomp.), of the formula

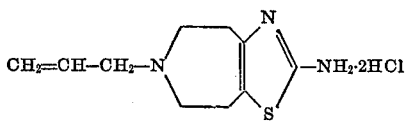

was prepared from 1-allyl-hexahydro-4H-azepin-4-one (B.P. 52–54° C. at 0.2 mm. Hg). The yield was 67% of theory.

*Analysis.*—Calculated for C₁₀H₁₅N₃S·2HCl (mol. wt. 282.24) (percent): C, 42.51; H, 6.07; N, 14.88. Found (percent): C, 42.60; H, 6.03; N, 14.90.

EXAMPLE 37

Using a procedure analogous to that described in Example 4, 2-amino-6-hexahydrobenzyl - 4,5,7,8-tetrahydro-6H - thiazolo[5,4-d]azepine dihydrochloride, M.P. 240° C. (decomp.), of the formula

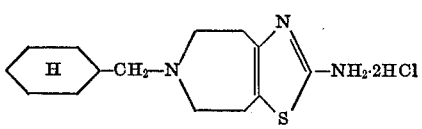

was prepared from 1-hexahydrobenzyl-hexahydro-4H-azepin-4-one hydrochloride (M.P. 180° C.). The yield was 40% of theory.

*Analysis.*—Calculated for C₁₄H₂₃N₃S·2HCl (mol. wt. 338.45) (percent): C, 49.69; H, 7.45; N, 12.42. Found (percent): C, 49.40; H, 7.36; N, 12.40.

EXAMPLE 38

Using a procedure analogous to that described in Example 1, 2-methylamino - 6 - ethyl-4,5,7,8-tetrahydro-6H-thiazolo[5,4-d]azepine dihydrochloride, M.P. 206° C. (decomp.), of the formula

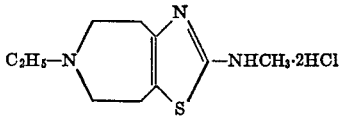

was prepared from 1-ethyl-5-bromo-hexahydro-4H-azepin-4-one hydrobromide (M.P. 138° C.) and N-methyl-thiourea. The yield was 27% of theory.

*Analysis.*—Calculated for $C_{10}H_{17}N_3S \cdot 2HCl$ (mol. wt. 284.31) (percent): C, 42.30; H, 6.75; N, 14.80. Found (percent): C, 41.90; H, 7.05; N, 14.48.

EXAMPLE 39

Using a procedure analogous to that described in Example 1, 2-ethylamino - 6 - ethyl-4,5,7,8-tetrahydro-6H-thiazolo[5,4-d]azepine dihydrochloride, M.P. 231° C. (decomp.), was prepared from 1-ethyl-5-bromo-hexahydro-4H-azepin-4-one hydrobromide (M.P. 138° C.) and N-ethyl-thiourea. The yield was 30% of theory.

*Analysis.*—Calculated for $C_{11}H_{19}N_3S \cdot 2HCl$ (mol. wt. 298.34) (percent): C, 44.30; H, 7.09; N, 14.10. Found (percent): C, 44.65; H, 6.97; N, 13.93.

EXAMPLE 40

Using a procedure analogous to that described in Example 1, 2-n-propylamino - 6 - ethyl-4,5,7,8-tetrahydro-6H-thiazolo[5,4-d]azepine dihydrochloride, M.P. 228° C. (decomp.), was prepared from 1-ethyl-5-bromo-hexahydro-4H-azepin-4-one hydrobromide (M.P. 138° C.) and N-n-propyl-thiourea. The yield was 55% of theory.

*Analysis.*—Calculated for $C_{12}H_{21}N_3S \cdot 2HCl$ (mol. wt. 312.36) (percent): C, 46.20; H, 7.42; N, 13.45. Found (percent): C, 46.40; H, 7.42; N, 13.68.

EXAMPLE 41

Using a procedure analogous to that described in Example 1, 2-isopropylamino - 6 - ethyl-4,5,7,8-tetrahydro-6H-thiazolo[5,4-d]azepine dihydrochloride, M.P. 244° C. (decomp.), was prepared from 1-ethyl-5-bromo-hexahydro-4H-azepin - 4 - one hydrobromide (M.P. 138° C.) and N-isopropyl-thiourea. The yield was 55% of theory.

*Analysis.*—Calculated for $C_{12}H_{21}N_3S \cdot 2HCl$ (mol. wt. 312.36) (percent): C, 46.20; H, 7.42; N, 13.45. Found percent): C, 46.15; H, 7.41; N, 13.60.

EXAMPLE 42

Using a procedure analogous to that described in Example 4, 2-ethylamino - 6 - allyl-4,5,7,8-tetrahydro-6H-thiazolo[5,4-d]azepine, M.P. 60° C., of the formula

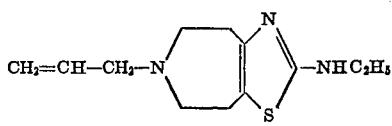

was prepared from 1-allyl - hexahydro-4H-azepin-4-one (B.P. 52–54° C. at 0.2 mm. Hg) and N-ethyl-thiourea. The yield was 26% of theory.

*Analysis.*—Calculated for $C_{12}H_{19}N_3S$ (mol. wt. 237.35) (percent): C, 60.75; H, 8.05; N, 17.73. Found (percent): C, 60.50; H, 8.16; N, 17.60.

EXAMPLE 43

Using a procedure analogous to that described in Example 4, 2-n-amylamino - 6 - allyl-4,5,7,8-tetrahydro-6H-thiazolo[5,4-d]azepine, M.P. <20° C., was prepared from 1-allyl-hexahydro - 4H - azepin-4-one (B.P. 52–54° C. at 0.2 mm. Hg) and N-n-amyl-thiourea. The yield was 54% of theory.

*Analysis.*—Calculated for $C_{15}H_{25}N_3S$ (mol. wt. 279.43) (percent): C, 64.50; H, 9.03; N, 15.04. Found (percent): C, 64.75; H, 9.01; N, 14.75.

EXAMPLE 44

Using a procedure analogous to that described in Example 4, 2-allylamino - 6 - allyl-4,5,7,8-tetrahydro-6H-thiazolo[5,4-d]azepine dihydrochloride, M.P. <20° C., of the formula

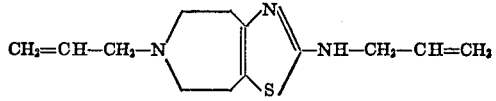

was prepared from 1-allyl-hexahydro-4H-azepin-4-one (B.P. 52–54° C. at 0.2 mm.Hg) and N-allyl-thiourea. The yield was 48% of theory.

*Analysis.*—Calculated for $C_{13}H_{19}N_3S$ (mol. wt. 249.36) (percent): C, 62.62; H, 7.68; N, 16.85. Found (percent): C, 62.60; H, 7.64; N, 16.60.

EXAMPLE 45

Using a procedure analogous to that described in Example 4, 2-cyclohexylamino - 6 - allyl-4,5,7,8-tetrahydro-6H-thiazolo[5,4-d]azepine, M.P. <20° C., of the formula

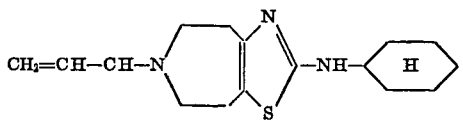

was prepared from 1-allyl-hexahydro-4H-azepin-4-one (B.P. 52–54° C. at 0.2 mm. Hg) and N-cyclohexyl-thiourea. The yield was 30% of theory.

*Analysis.*—Calculated for $C_{16}H_{25}N_3S$ (mol. wt. 291.44) (percent): C, 65.99; H, 8.65; N, 14.44. Found (percent): C, 66.20; H, 8.67; N, 14.37.

EXAMPLE 46

Using a procedure analogous to that described in Example 4, 2-phenylamino - 6 - allyl-4,5,7,8-tetrahydro-6H-thiazolo[5,4-d]azepine dihydrochloride, M.P. 195° C., of the formula

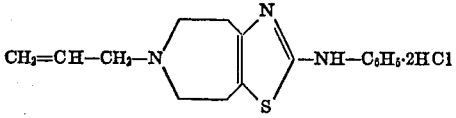

was prepared from 1 - allyl-hexahydro-4H-azepin-4-one (B.P. 52–54° C. at 0.2 mm. Hg) and N-phenyl-thiourea. The yield was 52% of theory.

*Analysis.*—Calculated for $C_{16}H_{19}N_3S \cdot 2HCl$ mol. wt. 358.39) (percent): C, 53.60; H, 5.91; N, 11.73. Found (percent): C, 53.40; H, 6.13; N, 11.47.

EXAMPLE 47

Using a procedure analogous to that described in Example 4, 2-methylamino-6-benzyl-4,5,7,8-tetrahydro-6H-thiazolo[5,4-d]azepine, M.P. 117° C., of the formula

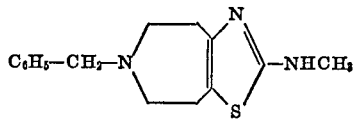

was prepared from 1-benzyl-hexahydro-4H-azepin-4-one (B.P. 98–100° C. at 0.1 mm. Hg) and N-methyl-thiourea. The yield was 22% of theory.

*Analysis.*—Calculated for $C_{15}H_{19}N_3S$ (mol. wt. 237.39) (percent): C, 65.95; H, 7.05; N, 15.35. Found (percent): C, 65.70; H, 6.99; N, 15.20.

EXAMPLE 48

Using a procedure analogous to that described in Example 4, except that isopropanol was used as the solvent instead of ethanol, 2-ethylamino - 6 - benzyl-4,5,7,8-tetrahydro-6H-thiazolo[5,4-d]azepine, M.P. 86° C., was prepared from 1-benzyl-hexahydro - 4H - azepin-4-one (B.P. 98–100° C. at 0.1 mm. Hg) and N-methyl-thiourea. The yield was 44% of theory.

*Analysis.*—Calculated for $C_{16}H_{21}N_3S$ (mol. wt. 287.42) (percent): C, 66.90; H, 7.36; N, 14.61. Fonud (percent): C, 66.70; H, 7.15; N, 14.35.

EXAMPLE 49

Using a procedure analogous to that described in Example 48, 2-n-propylamino - 6 - benzyl-4,5,7,8-tetrahydro-6H-thiazolo[5,4-d]azepine, M.P. 80° C., was prepared from 1-benzyl-hexahydro-4H-azepin-4-one (B.P. 98–100° C. at 0.1 mm. Hg) and N-n-propyl-thiourea. The yield was 50% of theory.

*Analysis.*—Calculated for $C_{17}H_{23}N_3S$ (mol. wt. 301.44) (percent): C, 67.74; H, 7.69; N, 13.92. Found (percent): C, 67.90; H, 7.67; N, 13.90.

EXAMPLE 50

Using a procedure analogous to that described in Example 48, 2-isopropylamino - 6 - benzyl-4,5,7,8-tetrahydro-6H-thiazolo[5,4-d]azepine, M.P. 96° C., was prepared from 1-benzyl-hexahydro-4H-azepin-4-one (B.P. 98–100° C. at 0.1 mm. Hg) and N-isopropyl-thiourea. The yield was 60% of theory.

*Analysis.*—Calculated for $C_{17}H_{23}N_3S$ (mol. wt. 301.44) (percent): C, 67.74; H, 7.69; N, 13.92. Found (percent): C, 67.70; H, 7.64; N, 13.78.

EXAMPLE 51

2-amino-6-ethyl-4,5,7,8-tetrahydro-6H-oxazolo[5,4-d] azepine and its dihydrochloride by method A 17 gm. (56.6 millimols) of 1-ethyl-5-bromo-hexahydro-4H-azepin-4-one hydrobromide were intimately admixed with 10.5 gm. (175 millimols) of urea, and 1 ml. of glacial acetic acid was added to the mixture. The resulting mixture was melted by heating to between 70 and 90° C. and was held at that temperature for from 5 to 8 hours. Thereafter, the molten mass was allowed to cool, was then dissolved in water, and the aqueous solution was adjusted to pH 12 with sodium hydroxide and extracted with chloroform. The combined chloroform extracts were dried and evaporated, and the residue was recrystallized from ethyl acetate, yielding 4.2 gm. (41% of theory) of the free base, M.P. 152–153° C., of the formula

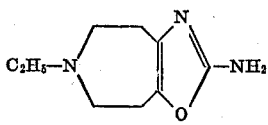

The free base was dissolved in ethanol, the resulting solution was acidified with isopropanolic hydrochloric acid, ether was added to the acidic solution, and the precipitate formed thereby was collected, yielding the dihydrochloride, M.P. 217–219° C. (decomp.).

*Analysis.*—Calculated for $C_9H_{15}N_3O \cdot 2HCl$ (mol. wt. 254.06) (percent): C, 42.56; H, 6.74; N, 16.54. Found (percent): C, 42.70; H, 6.84; N, 16.72.

EXAMPLE 52

Using a procedure analogous to that described in Example 51, 2-amino-6-n-propyl-4,5,7,8-tetrahydro-6H-oxazolo[5,4-d]azepine, M.P. 122° C. (ether), and its dihydrochloride, M.P. 221° C. (decomp.), of the formula

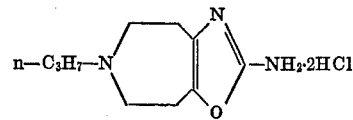

were prepared from 1-n-propyl-5-bromo-hexahydro-4H-azepin-4-one hydrobromide and urea. The yield was 42% of theory.

*Analysis.*—Calculated for $C_{10}H_{17}N_3O \cdot 2HCl$ (mol. wt. 268.19) (percent): C, 44.78; H, 7.14; N, 15.67. Found (percent): C, 44.90; H, 7.26; N, 15.62.

EXAMPLE 53

Using a procedure analogous to that described in Example 51, 2-amino-6-isopropyl-4,5,7,8-tetrahydro-6H-oxazolo[5,4-d]azepine, M.P. 110° C., was prepared from 1-isopropyl-5-bromo-hexahydro-4H-azepin-4-one hydrobromide and urea. The yield was 38% of theory.

*Analysis.*—Calculated for $C_{10}H_{17}N_3O$ (mol. wt. 195.25) (percent): C, 61.55; H, 8.77; N, 21.55. Found (percent): C, 61.75; H, 8.93; N, 21.80.

EXAMPLE 54

Using a procedure analogous to that described in Example 51, 2-amino-6-n-butyl - 4,5,7,8 - tetrahydro-6H-oxazolo[5,4-d]azepine dihydrochloride, M.P. 210° C. (decomp.), was prepared from 1-n-butyl-5-bromo-hexahydro-4H-azepin-4-one hydrobromide and urea. The yield was 41% of theory.

*Analysis.*—Calculated for $C_{11}H_{19}N_3O \cdot 2HCl$ (mol. wt. 282.28) (percent): C, 46.72; H, 7.49; N, 14.86. Found (percent): C, 46.75; H, 7.53; N, 14.87.

EXAMPLE 55

Using a procedure analogous to that described in Example 51, 2-amino-6-isobutyl-4,5,7,8-tetrahydro-6H-oxazolo[5,4-d]azepine dihydrochloride, M.P. 210° C. (decomp.), was prepared from 1-isobutyl-5-bromo-hexahydro-4H-azepin-4-one hydrobromide and urea. The yield was 43% of theory.

*Analysis.*—Calculated for $C_{11}H_{19}N_3O \cdot 2HCl$ (mol. wt. 282.28) (percent): C, 46.72; H, 7.49; N, 14.86. Found (percent): C, 46.50; H, 7.52; N, 15.06.

EXAMPLE 56

Using a procedure analogous to that described in Example 51, 2-amino-6-allyl-4,5,7,8-tetrahydro-6H-oxazolo-[5,4-d]azepine dihydrochloride, M.P. 209° C. (decomp.), of the formula

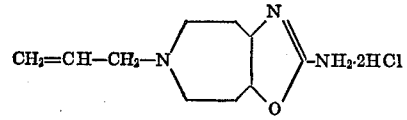

was prepared from 1-allyl-5-bromo-hexahydro-4H-azepin-4-one hydrobromide and urea. The yield was 12% of theory.

*Analysis.*—Calculated for $C_{10}H_{15}N_3O \cdot 2HCl$ (mol. wt. 266.24) (percent): C, 45.10; H, 6.43; N, 15.80. Found (percent): C, 45.00; H, 6.52; N, 15.70.

EXAMPLE 57

Using a procedure analogous to that described in Example 51, 2-amino-6-benzyl - 4,5,7,8 - tetrahydro-6H-oxazolo[5,4-d]azepine dihydrochloride, M.P. 209° C. (decomp.), of the formula

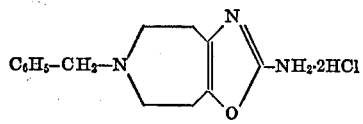

was prepared from 1-benzyl-5-bromo-hexahydro-4H-azepin-4-one hydrobromide and urea. The yield was 48% of theory.

*Analysis.*—Calculated for $C_{14}H_{17}N_3O \cdot 2HCl$ (mol wt. 316.24) (percent): C, 53.20; H, 6.06; N, 13.29. Found (percent): C, 53.25; H, 6.25; N, 13.15.

EXAMPLE 58

Using a procedure analogous to that described in Example 51, 2-amino-6-hexahydrobenzyl-4,5,7,8-tetrahydro-6H-oxazolo[5,4 - d]azepine dihydrochloride, M.P. 228–229° C. (decomp.), of the formula

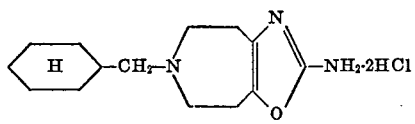

was prepared from 1-hexahydrobenzyl - 5 - bromo - hexahydro-5H-azepin-4-one hydrobromide and urea. The yield was 18% of theory.

*Analysis.*—Calculated for $C_{14}H_{23}N_3O \cdot 2HCl$ (mol. wt. 322.27) (percent): C, 52.18; H, 7.85; N, 13.04. Found (percent): C, 51.90; H, 7.65; N, 12.90.

EXAMPLE 59

Using a procedure analogous to that described in Example 51, 2 - amino-6-(p-methyl-benzyl)-4,5,7,8-tetrahydro-6H - oxazolo[5,4 - d]azepine dihydrochloride, M.P. 204° C. (decomp.), of the formula

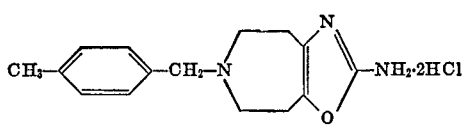

was prepared from 1-(p-methyl-benzyl) - 5 - bromo-hexahydro - 4H - azepin-4-one hydrobromide and urea. The yield was 23% of theory.

*Analysis.*—Calculated for $C_{15}H_{19}N_3O \cdot 2HCl$ (mol. wt. 330.24) (percent): C, 54.56; H, 6.41; N, 12.72. Found (percent): C, 54.90; H, 6.98; N, 12.40.

EXAMPLE 60

2-amino-6-(β-hydroxy-ethyl)-4,5,7,8-tetrahydro-6H-thiazolo[5,4-d]azepine dihydrochloride by method B 20.5 gm. (137 millimols) of hexahydro-4H-azepin-4-one were dissolved in a mixture consisting of 180 ml. of glacial acetic acid and 20 ml. of a 40% hydrogen bromide solution in glacial acetic acid, and brominated at room temperature with a solution of 22 gm. of bromine in 80 ml. of glacial acetic acid. Thereafter, the glacial acetic acid and the hydrogen bromide were distilled off, the residual raw 5-bromo-hexahydro-4H-azepin-4-one hydrobromide was dissolved in 250 ml. of ethanol, 24.7 gm. of N-benzoyl-thiourea were added, and the mixture was heated at its boiling point for 14 hours. During that time 31 gm. (64% of theory) of 2-benzamido-4,5,7,8 - tetrahydro-6H-thiozolo[5,4-d]azepine hydrobromide crystallized out, which were collected and converted into the free base with sodium hydroxide. The free base was dissolved in 200 ml. of methanol, 6 gm. of ethyleneoxide were added to the solution, and the mixture was stirred at room temperature. Thereafter, the methanol was evaporated, the residue—2-benzamido-6 - (β - hydroxyethyl)-4,5,7,8-tetrahydro - 6H - thiazolo[5,4-d]azepine—was dissolved in ethanol, and the resulting solution was acidified was isopropanolic hydrochloric acid, yielding 42% of theory of 2-benzamido-6-(β - hydroxy - ethyl)-4,5,7,8-tetrahydro - 6H - thiazolo[5,4-d]azepine - hydrochloride, M.P. 146° C. This compound was then hydrolized by boiling for 8 hours with aqueous 20% hydrochloric acid, the reaction solution was subsequently made alkaline with sodium hydroxide and then extracted with chloroform, the chloroform extracts were evaporated, the residue—2-amino - 6 - (β-hydroxy - ethyl) - 4,5,7,8-tetrahydro - 6H - thiazolo[5,4-d]azepine—was dissolved in ethanol, the solution was acidified with isopropanolic hydrochloric acid, and acetone was added to the acidic solution to precipitate the reaction product. 55% of theory of the dihydrochloride, M.P. 192° C. (decomp.), of the formula

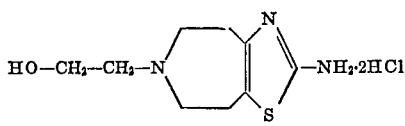

were obtained.

*Analysis.*—Calculated for $C_9H_{15}N_3OS \cdot 2HCl$ (mol wt. 286.22) (percent): C, 37.81; H, 5.99; N, 14.68. Found (percent): C, 37.65; H, 5.83; N, 14.67.

EXAMPLE 61

Using a procedure analogous to that described in Example 60, 2 - amino - 6 - (β-hydroxy-propyl)-4,5,7,8-tetrahydro - 6H - thiazolo[5,4-d]azepine dihydrochloride, M.P. 221° C. (decomp.), of the formula

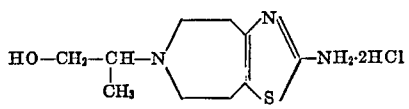

was prepared from 2-benzamido-4,5,7,8-tetrahydro - 6H-thiazolo[5,4-d]azepine and propyleneoxide. The yield was 43% of theory.

*Analysis.*—Calculated for $C_{10}H_{17}N_3OS \cdot 2HCl$ (mol. wt. 300.25) (percent): C, 39.95; H, 6.38; N, 13.98. Found (percent): C, 40.00; H, 6.47; N, 13.75.

The compounds according to the present invention, that is, those embraced by Formulas I and Ia above and their non-toxic acid addition salts, have useful pharmacodynamic properties. More particularly, the compounds exhibit hypotensive, sedative, antitussive and antiphlogistic activities, coupled with very low toxicity, in warm-blooded animals, such as cats, mice and rats. All of the compounds of the instant invention exhibit all of these pharmacological properties, although one of these activities may be more pronounced than the others, depending upon the particular $R_1$- and $R_2$-substitution.

Thus, the hypotensive activity is particularly pronounced in those compounds of the Formula I wherein $R_1$ is alkyl, allyl or an unsubstituted or substituted aralkyl radical and $R_2$ is hydrogen. Especially noteworthy is the fact that, among this sub-generic class of compounds, those wherein $R_1$ is unsubstituted or substituted aralkyl produce no initial increase in the blood pressure and only minor sedative effects.

The effects upon the blood pressure were ascertained on cats under α-D-(+)-glucochloralose/urethane anesthesia. These tests showed that the hypotensive activity is especially pronounced in the following compounds:

2-amino-6-benzyl-4,5,7,8-tetrahydro-6H-thiazolo
 [5,4-d]azepine,
2-amino-6-(p-chloro-benzyl)-4,5,7,8-tetrahydro-6H-
 thiazolo[5,4-d]azepine,
2-amino-6-(m-bromo-benzyl)-4,5,7,8-tetrahydro-6H-
 thiazolo[5,4-d]azepine, 2-amino-6-(4'-methyl-benzyl)-4,5,7,8-tetrahydro-6H-thiazolo[5,4-d]azepine,
2-amino-6-(p-trifluoromethyl-benzyl)-4,5,7,8-tetrahydro-6H-thiazolo[5,4-d]azepine,
2-amino-6-(m-trifluoromethyl-benzyl)-4,5,7,8-tetrahydro-6H-thiazolo[5,4-d]azepine, and
2-amino-6-(p-fluoro-benzyl)-4,5,7,8-tetrahydro-6H-thiazolo[5,4-d]azepine.

The compounds of the Formulas I and Ia wherein $R_1$ is alkyl or allyl and $R_2$ is hydrogen exhibit also very effective antiphlogistic, sedative and antitussive activities.

In compounds of the Formula I wherein $R_1$ and $R_2$ are both alkyl the sedative activity is especially pronounced.

The antitussive activity was ascertained in rats by the standard test method of Engelhorn and Püschmann, Arzneimittelforschung 13, 474 (1963), and this activity was found to be particularly pronounced in the following compounds:

2-amino-6-butyl-4,5,7,8-tetrahydro-6H-thiazolo [5,4-d]azepine,
2-amino-6-allyl-4,5,7,8-tetrahydro-6H-thiazolo [5,4-d]azepine,
2-amino-6-ethyl-4,5,7,8-tetrahydro-6H-oxazolo [5,4-d]azepine, and
2-amino-6-allyl-4,5,7,8-tetrahydro-6H-oxazolo [5,4-d]azepine.

The sedative activity was ascertained in mice by the standard test method of Friebel et al., Arzneimittelforschung, 9, 126 (1959), and this activity was found to be particularly pronounced in the following compounds:

2-amino-6-allyl-4,5,7,8-tetrahydro-6H-oxazolo [5,4-d]azepine,
2-amino-6-ethyl-4,5,7,8-tetrahydro-6H-thiazolo [5,4-d]azepine,
2-amino-6-isopropyl-4,5,7,8-tetrahydro-6H-thiazolo [5,4-d]azepine,
2-ethylamino-6-ethyl-4,5,7,8-tetrahydro-6H-thiazolo [5,4-d]azepine, and
2-ethylamino-6-propyl-4,5,7,8-tetrahydro-6H-thiazolo [5,4-d]azepine.

The antiphlogistic activity was ascertained, in terms of the anti-exudative effect against the carrageeninedema in the hind paw of the rat, by the standard test method of Winter et al., Proc. Soc. Exper. Biol. Med., 111, 544–547 (1962), and against the kaolin-edema in the hind paw of the rat by the method of Hillebrecht, Arzneimittelforschung, 4, 607–614 (1954). These tests showed that the antiphlogistic activity is particularly pronounced in the following compounds:

2-amino-6-allyl-4,5,7,8-tetrahydro-6H-thiazolo [5,4-d]azepine,
2-amylamino-6-allyl-4,5,7,8-tetrahydro-6H-thiazolo [5,4-d]azepine, and
2-allylamino-6-allyl-4,5,7,8-tetrahydro-6H-thiazolo [5,4-d]azepine.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.0033 to 0.167 mgm./kg. body weight, preferably 0.0033 to 0.084 mgm./kg. body weight. The average daily dose is from 0.0033 to 0.34 mgm./kg. body weight, preferably from 0.0033 to 0.167 mgm./kg. body weight.

The following examples illustrate a few dosage unit compositions comprising a compound of the present invention as an active ingredient and represent the best modes contemplated of putting the invention to practical use. The parts are parts by weight unless otherwise specified.

EXAMPLE 62

Coated pills

The pill core composition is compounded from the following ingredients:

| | Parts |
|---|---|
| 2-amino-6-(p-chloro-benzyl)-4,5,7,8-tetrahydro-6H-thiazolo[5,4-d]azepine·2HCl | 5.0 |
| Lactose | 33.5 |
| Corn starch | 10.0 |
| Gelatin | 1.0 |
| Magnesium stearate | 0.5 |
| Total | 50.0 |

Preparation

The thiazoloazepine compound is intimately admixed with the lactose and the corn starch, the mixture is moistened with an aqueous 10% solution of the gelatin, the moist mass is granulated by forcing it through a 1 mm.-mesh screen, the granulate is dried at 40° C. and again passed through the screen, admixed with the magnesium stearate, and the composition is compressed into 50 mgm.-pill cores. The entire procedure must be carried out in a darkened room. The pill cores are then coated with a thin shell consisting essentially of a mixture of sugar and talcum, and the coated pills are polished with beeswax. Each pill contains 5.0 mgm. of the thiazoloazepine compound and is an oral dosage unit composition with effective hypotensive action.

EXAMPLE 63

Drop solution

The solution is compounded from the following ingredients:

| | Parts |
|---|---|
| Ethyl p-hydroxy-benzoate | 0.035 |
| Propyl p-hydroxy-benzoate | 0.015 |
| Oil of anise | 0.05 |
| Menthol | 0.06 |
| Ethanol, pure | 10.0 |
| 2-amino-6-(p-chloro-benzyl)-4,5,7,8-tetrahydro-6H-thiazolo[5,4-d]azepine·2HCl | 0.5 |
| Citric acid | 0.7 |
| Secondary sodium phosphate·2H$_2$O | 0.3 |
| Sodium cyclamate | 1.0 |
| Glycerin | 15.0 |
| Distilled water, q.s. ad 100.0 parts by vol. | |

Preparation

The p-hydroxy-benzoic acid alkyl esters, the oil of anise and the menthol are dissolved in the ethanol (solution A).

The buffers, the thiazoloazepine compound and the sodium cyclamate are dissolved in distilled water, and the glycerin is added thereto (solution B).

Solution A is stirred into solution B, the mixture is diluted with distilled water to the indicated volume, the finished solution is filtered, and the filtrate is filled into brown 100 ml. bottles.

All of the above operations must be carried out under exclusion of light and in an inert gas atmosphere.

1 ml. (about 20 drops) of the solution contains 5 mgm. of the thiazoloazepine compound and is an oral dosage unit composition with effective hypotensive action.

EXAMPLE 64

Suppositories

The suppository composition is compounded from the following ingredients:

| | Parts |
|---|---|
| 2-amino-6-(p-chloro-benzyl)-4,5,7,8-tetrahydro-6H-thiazolo[5,4-d]azepine·2HCl | 10.0 |
| Suppository base (e.g. cocoa butter) | 1690.0 |
| Total | 1700.0 |

Preparation

The finely powdered thiazoloazepine compound is blended with the aid of an immersion homogenizer into the suppository base which had previously been melted and cooled to 40° C. 1700 mgm. portions of the composition are poured at 35° C. into cooled suppository molds. Each suppository contains 10 mgm. of the thiazoloazepine compound and is a rectal dosage unit composition with effective hypotensive action.

EXAMPLE 65

Hypodermic solution

The solution is compounded from the following ingredients:

| | Parts |
|---|---|
| 2-amino-6-(p-chloro-benzyl)-4,5,7,8-tetrahydro-6H-thiazolo[5,4-d]azepine·2HCl | 5.0 |
| Citric acid | 7.0 |
| Secondary sodium phosphate·2H$_2$O | 3.0 |
| Sodium pyrosulfite | 1.0 |
| Distilled water, q.s. ad 1000.0 parts by vol. | |

Preparation

The buffers, the thiazoloazepine compound and the sodium pyrosulfite are successively dissolved in a sufficient amount of distilled water which had previously been boiled and allowed to cool in an atmosphere of carbon dioxide. The solution is diluted to the indicated volume with additional boiled distilled water, filtered until free from suspended matter, and the filtrate is filled into brown 1 cc. ampules in an inert gas atmosphere, which are sealed and sterilized for 20 minutes at 120° C. The preparation of the solution and the filling procedure must be carried out in a darkened room. Each ampule contains 5 mgm. of the thiazoloazepine compound and the contents thereof are a parenterally injectable dosage unit composition with effective hypotensive action.

A dosage unit composition comprising a compound of the instant invention may also contain one or more other active ingredients having the same or different pharmacological properties, as illustrated by the following examples.

EXAMPLE 66

Coated pills

The pill core composition is compounded from the following ingredients:

| | Parts |
|---|---|
| 2-amino-6-(p-chloro-benzyl)-4,5,7,8-tetrahydro-6H-thiazolo[5,4-d]azepine·2HCl | 0.2 |
| 2,6-bis-(diethanol-amino)-4,8-dipiperidino-pyrimido[5,4-d]pyridine | 25.0 |
| Digoxin | 0.25 |
| Lactose | 66.55 |
| Potato starch | 25.0 |
| Polyvinylpyrrolidone | 2.0 |
| Magnesium stearate | 1.0 |
| Total | 120.0 |

Preparation

The thiazoloazepine compound, the pyrimidopyrimidine compound, the digoxin, the potato starch and the lactose are intimately admixed with each other, the mixture is moistened with an ethanolic 10% solution of the polyvinylpyrrolidone, the moist mass is granulated by forcing it through a 1.5 mm.-mesh screen, the granulate is dried at 40° C. and again passed through a 1 mm.-mesh screen, the dry granulate is admixed with the magnesium stearate, and the finished composition is compressed into 120 mgm.-pill cores, which are coated with a thin shell consisting essentially of a mixture of sugar and talcum, and polished with beeswax. Each pill contains 0.2 mgm. of the thiazoloazepine compound, 25 mgm. of the pyrimidopyrimidine compound and 0.25 mgm. of digoxin, and is an oral dosage unit composition with effective hypotensive, coronary vasodilating and cardiotonic actions.

EXAMPLE 67

Gelatin capsules

The capsule filler composition is compounded from the following ingredients:

| | Parts |
|---|---|
| 2-amino-6-(p-chloro-benzyl)-4,5,7,8-tetrahydro-6H-thiazolo[5,4-d]azepine·2HCl | 10.0 |
| Codeine phosphate | 10.0 |
| Tartaric acid | 1.0 |
| Corn starch | 84.0 |
| Total | 100.0 |

Preparation

The ingredients are intimately and homogeneously admixed with each other, and 100 mgm. portions of the mixture are filled into opaque gelatin capsules of suitable size. Each capsule contains 5 mgm. of the thiazoloazepine compound and 10 mgm. of codeine phosphate, and its contents are an oral dosage unit composition with effective hypotensive and antitussive actions.

Analogously any one of the other compounds embraced by Formulas I and Ia, or a non-toxic acid addition salt thereof, may be substituted for the particular thiazoloazepine salt in Examples 62 through 67. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

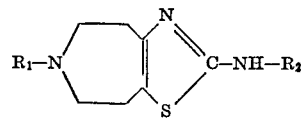

or

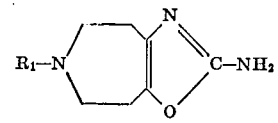

wherein

R$_1$ is hydrogen, alkyl of 1 to 4 carbon atoms, hydroxyalkyl of 1 to 4 carbon atoms, allyl, cyclohexyl, hexahydrobenzyl, phenyl, phenethyl, benzyl, mono- or di-halobenzyl, mono-, di- or trimethoxybenzyl, trifluoromethyl-benzyl or (alkyl of 1 to 3 carbon atoms)-benzyl, and R₂ is hydrogen, alkyl of 1 to 5 carbon atoms, allyl, cyclohexyl, phenyl, benzyl or phenethyl, or a non-toxic, pharmacologically acceptable acid addition salt thereof.

2. A compound of the formula

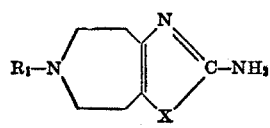

wherein

X is oxygen or sulfur, and

R₁ is allyl, alkyl of 1 to 3 carbon atoms, benzyl, halobenzyl, trifluoromethyl-benzyl or methyl-benzyl, or a non-toxic, pharmacologically acceptable acid addition salt thereof.

3. A compound according to claim 2, which is 2-amino-6-benzyl-4,5,7,8-tetrahydro-6H-thiazolo[5,4 - d]azepine or a non-toxic, pharmacologically acceptable acid addition salt thereof.

4. A compound according to claim 2, which is 2-amino-6-(p - chloro-benzyl) - 4,5,7,8 - tetrahydro - 6H - thiazolo-[5,4-d]azepine or a non-toxic, pharmacologically acceptable acid addition salt thereof.

5. A compound according to claim 2, which is 2-amino-6 - (p - methyl - benzyl) - 4,5,7,8 - tetrahydro - 6H - thiazolo[5,4-d]azepine or a nontoxic, pharmacologically acceptable acid addition salt thereof.

6. A compound according to claim 2, which is 2-amino-6 - (p - trifluoromethyl - benzyl) - 4,5,7,8 - tetrahydro-6H-thiazolo[5,4-d]azepine or a non-toxic, phramacologically acceptable acid addition salt thereof.

7. A compound according to claim 2, which is 2-amino-6 - (m - trifluoromethyl - benzyl) - 4,5,7,8 - tetrahydro-6H-thiazolo[5,4-d]azepine or a non-toxic, pharmacologically acceptable acid addition salt thereof.

8. A compound according to claim 2, which is 2-amino-6 - allyl - 4,5,7,8 - tetrahydro - 6H - thiazolo[5,4-d]azepine or a non-toxic, pharmacologically acceptable acid addition salt thereof.

9. A compound according to claim 2, which is 2-amino-6 - ethyl - 4,5,7,8 - tetrahydro - 6H - oxazolo[5,4 - d]azepine or a non-toxic, pharmacologically acceptable acid addition salt thereof.

10. A compound according to claim 2, which is 2-amino - 6 - allyl - 4,5,7,8 - tetrahydro - 6H - oxazolo[5,4-d]azepine or a non-toxic, pharmacologically acceptable acid addition salt thereof.

No references cited.

RICHARD J. GALLAGHER, Primary Examiner

U.S. Cl. X.R.

260—239 B, 253, 307 R; 424—200, 253, 270, 272